United States Patent [19]

Horton

[11] 4,434,676

[45] Mar. 6, 1984

[54] TRACTION ROLLER TRANSMISSION WITH MECHANICAL TRANSMISSION RATIO CONTROL

[75] Inventor: Paul L. Horton, Austin, Tex.

[73] Assignee: Excelermatic Inc., Austin, Tex.

[21] Appl. No.: 360,597

[22] Filed: Mar. 22, 1982

[51] Int. Cl.³ .................... F16H 15/40; F16H 15/08
[52] U.S. Cl. ........................................ 74/200; 74/190
[58] Field of Search ............... 74/194, 200, 190, 201, 74/199, 190.5, 206, 208, 99 A, 99 I, 424.8 UA; 92/31

[56] References Cited

U.S. PATENT DOCUMENTS

| | | | |
|---|---|---|---|
| 2,123,007 | 7/1938 | Hayes | 74/200 |
| 2,748,614 | 6/1956 | Weisel | 74/190.5 |
| 2,850,911 | 9/1958 | Kraus | 74/200 |
| 2,875,632 | 3/1959 | O'Rourke | 74/424.8 R |
| 2,942,580 | 6/1960 | Siravo | 74/99 I |
| 3,841,173 | 10/1974 | Kraus | 74/200 |
| 4,196,654 | 4/1980 | Stearns | 92/31 |
| 4,275,610 | 6/1981 | Kraus | 74/201 |
| 4,339,966 | 7/1982 | Kraus | 74/200 |

*Primary Examiner*—Lawrence J. Staab
*Assistant Examiner*—Michael David Bednarek
*Attorney, Agent, or Firm*—Klaus J. Bach

[57] ABSTRACT

In an infinitely variable traction roller transmission which has toric traction elements mounted opposite each other on coaxial input and output shafts with traction rollers arranged between, and in engagement with, the toric elements, the traction rollers are supported on pivot trunnions which may be moved axially for initiation of a change of the transmission ratio and the trunnions have a lever arrangement associated therewith including arms pivotally connected to their one ends to the trunnions and joined at their other ends, each arm being linked to a control lever pivotally supported in the center plane between the trunnions so as to provide, upon control lever pivoting, the same precess force to the trunnions, however in opposite directions.

5 Claims, 4 Drawing Figures

TRACTION ROLLER TRANSMISSION WITH MECHANICAL TRANSMISSION RATIO CONTROL

BACKGROUND OF THE INVENTION

The invention relates to traction roller transmissions in which motion is transmitted from an input to an output shaft by traction rollers arranged between, and in engagement with, toric discs mounted opposite each other on the input and output shafts.

In such transmissions, the traction rollers are supported on support trunnions which permit pivotal movement of the traction rollers for adjustment of different transmission ratios. A change of transmission ratio may be initiated by slight axial movement of the trunnions, which axial movement out of their center positions causes the traction rollers to climb to different circles of engagement with the toric discs.

It is known to apply axial forces to the trunnions by admission of pressurized fluid from a pressurized fluid source to the piston and cylinder structures disposed at the axial ends of the trunnions. Such arrangements however require hydraulic fluid pumps which are relatively expensive and also relatively heavy. And while such fluid pumps do not add significantly to the cost of a high power transmission, the cost of such pump and its power consumption are quite noticeable in connection with small, low power transmissions as they may be used for example in the drive trains of motorcycles.

Although hydraulic operating mechanisms for the pivot trunnions of traction roller transmissions have proved to function well and reliably, it would be desirable for some applications, particularly for use in low power transmission applications, to have a mechanical trunnion operating mechanism for controlling the transmission ratio.

SUMMARY OF THE INVENTION

In an infinitely variable traction roller transmission, toric traction discs are mounted opposite each other on coaxial transmission input and output shafts. Traction rollers are rotatably supported on pivotal support trunnions such that they are disposed between, and in firm engagement with, the toric traction discs for the transmission of motion therebetween. The support trunnions are axially movable and precess levers are linked to their ends to permit initiation of a change of the transmission ratio. The precess levers are connected to an operating mechanism for the transmission of precess forces from the operating mechanism to the trunnions.

DESCRIPTION OF THE PREFERRED EMBODIMENT

Figure 1:
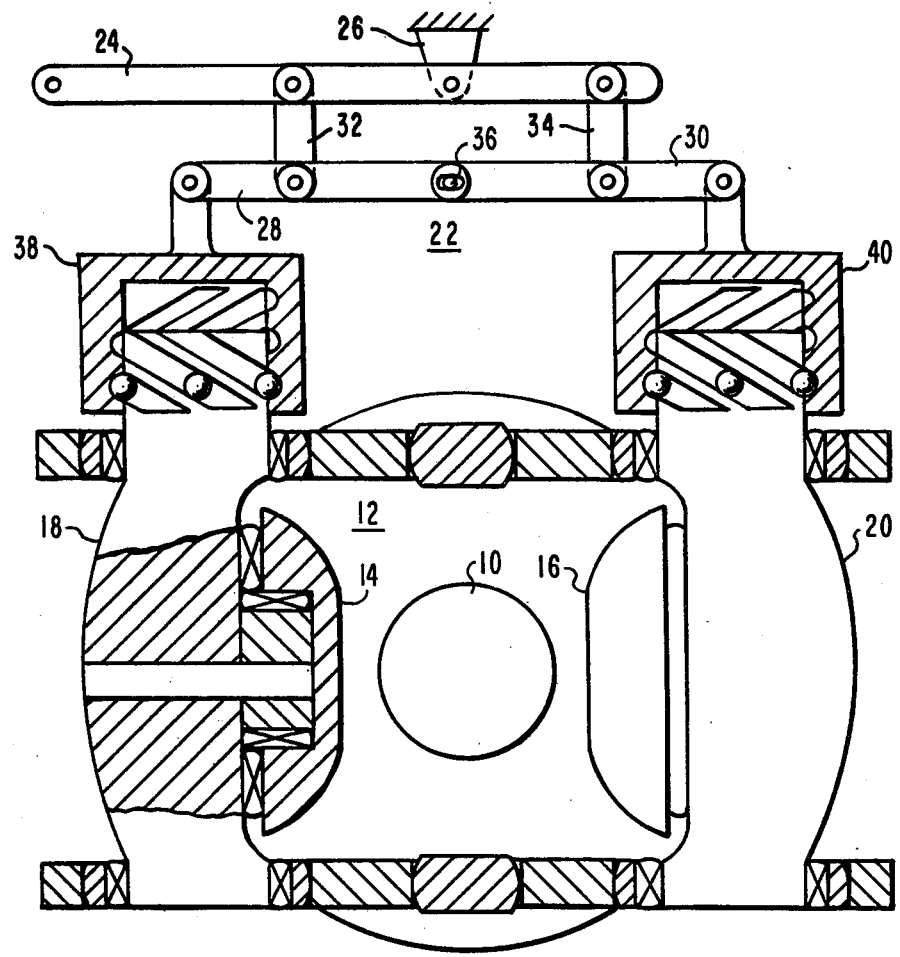
FIGS. 1 to 3 show schematically various embodiments of an infinitely variable traction roller drive control arrangement according to the present invention.

Infinitely variable traction roller transmissions of the type with which the present invention is concerned are disclosed and described in detail in the present inventor's earlier U.S. Pat. Nos. 3,810,398 and 4,275,610. In principle, they consist of coaxial input and output shafts 10 which have toric discs 12 mounted thereon opposite each other with traction rollers 14 and 16 disposed therebetween and in engagement therewith. The traction rollers 14 and 16 are rotatably supported on pivotal support trunnions 18 and 20 which are movable in axial direction for initiation of a transmission ratio change. As shown schematically in FIG. 1, axial movement of the trunnions 18, 20 in opposite directions is effected by a lever arrangement 22 consisting of a control lever 24 pivotally supported on a pivot support 26. At equal distances from the pivot support 26 the control lever 24 is linked to two arms 2 and 30 by links 32 and 34, the two arms 28 and 30 being pivotally joined with slight axial play at one end by a stud 36 and pivotally connected to the ends of the trunnions 18 and 20 such that pivotal movement of the control lever 24 causes movement of the trunnions with equal forces in opposite directions, thereby providing precess movement of the traction rollers 14 and 16. Preferably the arms 28 and 30 are joined to the trunnions 18 and 20 by means of roller screw structures 38 and 40 so that, upon initial axial precess displacement of the trunnions 18 and 20 they will, when pivoting to the desired transmission ratio position, return to their neutral axial position as such pivoting causes the trunnions to move axially into, or out of, the screw structures 38 and 40 while the control lever remains in the preselected pivot position for the selected transmission ratio.

Figure 2:
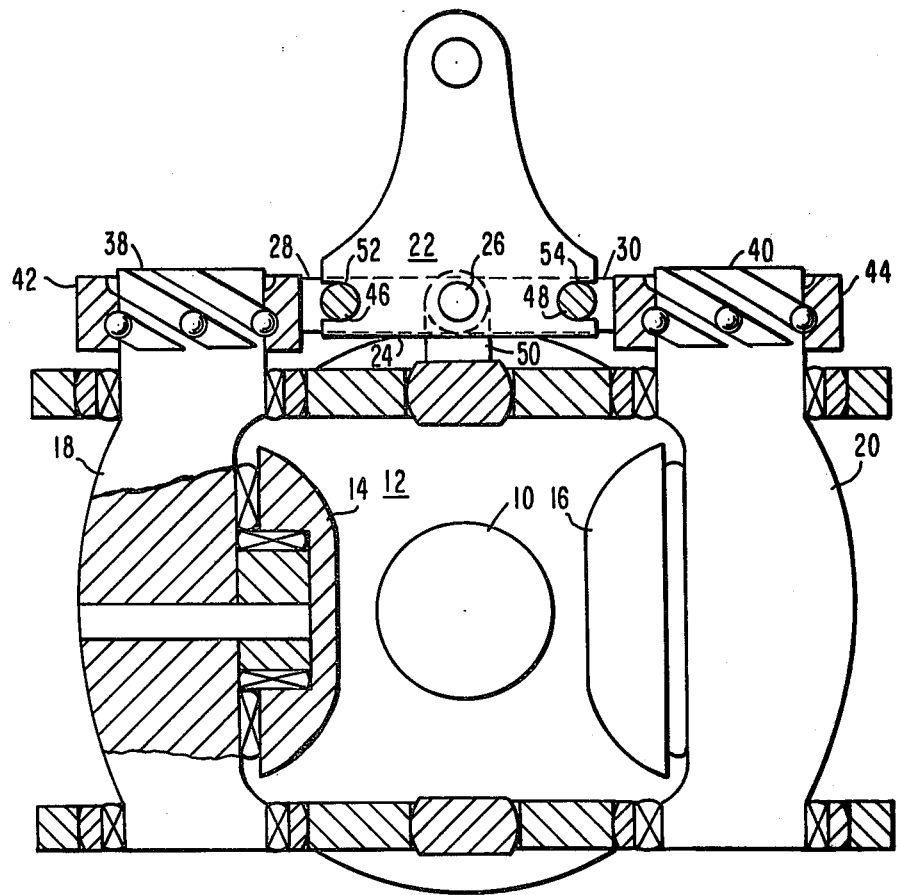
Figure 3:
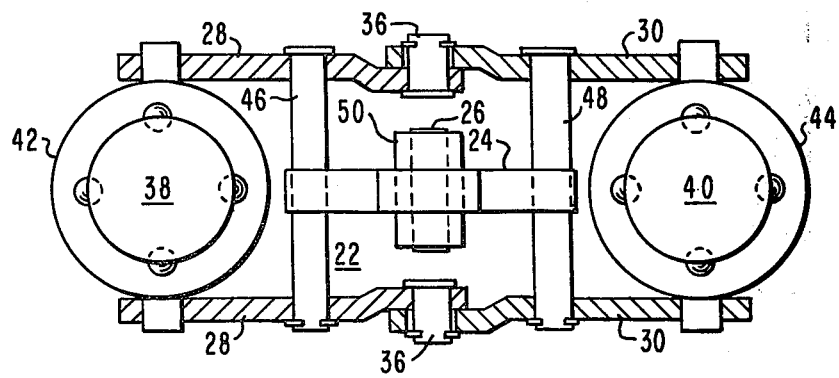
Figure 4:
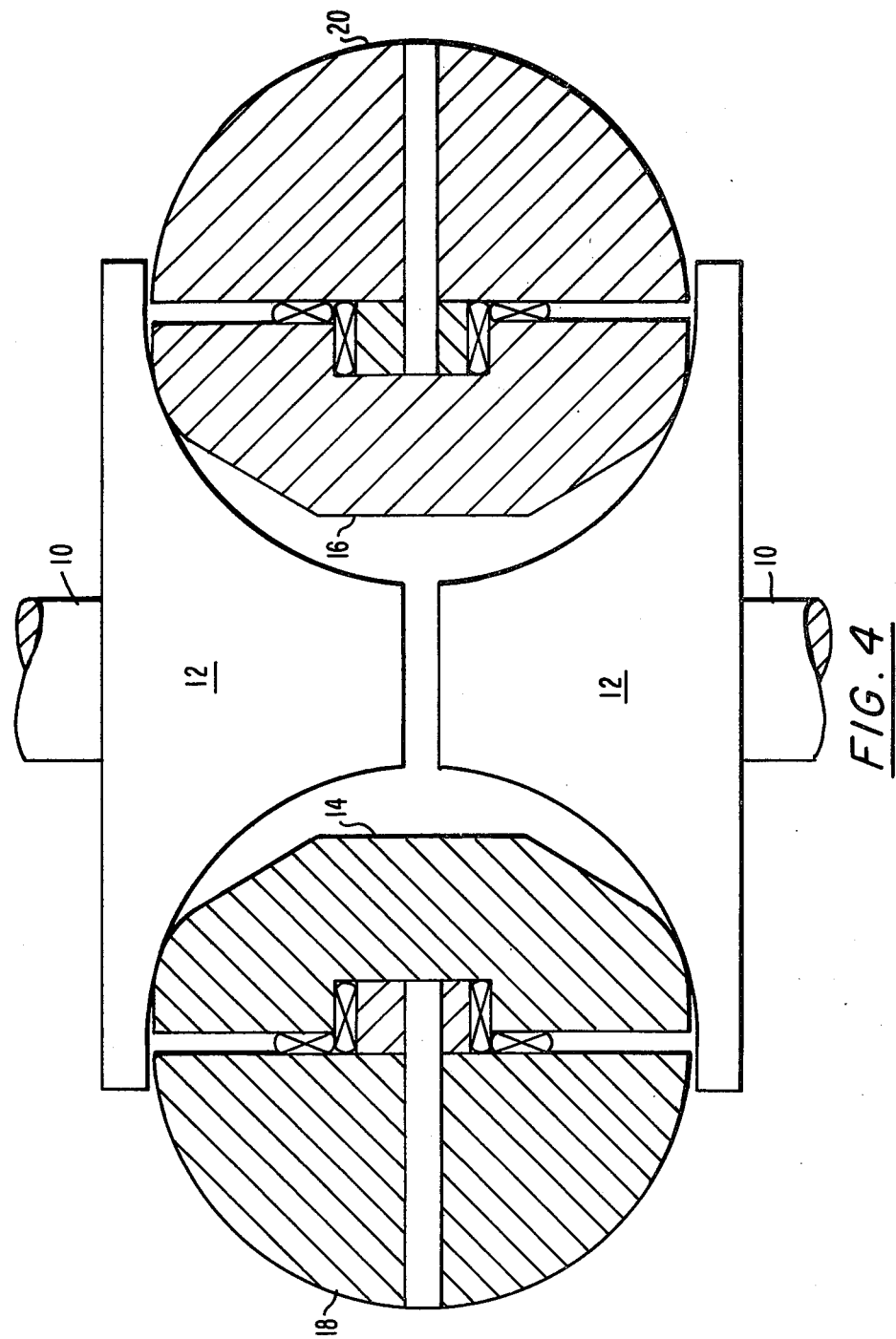
FIG. 4 is a cross-sectional view showing the input and output shafts with the traction rollers engaged between the toric discs.

FIGS. 2 and 3 show a transmission using a lever arrangement in function equal to that shown in FIG. 1. The corresponding parts have been assigned the same numbers. The transmission is not shown in detail since the transmission per se is the same as those shown in the patents referred to before.

In FIG. 1 links 32 and 34 had been included for showing the various levers in different planes so as to facilitate explanation. These links are removed in the arrangement as shown in FIGS. 2 and 3 so that lever 24 is disposed in the same plane as arms 28 and 30. In order to apply the precess forces evenly to the rings 42 and 44 of the roller screw structures 38 and 40, arms 28 and 30 are provided at opposite sides of, and joined to, the rings 42 and 44 along axes extending through the centers of the screw structures 38 and 40, the arms 28, 30 being pivotally joined at their other ends by studs 36. Arms 28 are joined by a cross-bolt 46 and arms 30 are joined by a cross-bolt 48 and the operating lever 24 is pivotally supported in the center between the cross-bolts 46 and 48 by a support bolt 26 which is mounted on a housing (only portion 50 being shown) preferably in axial alignment with the studs 36. The operating lever 24 has opposite slots 52 and 54 receiving the cross-bolts 46 and 48 so that pivoting of the operating lever provides for movement of the roller screw structures 38, 40 and the trunnions 18 and 20 in opposite directions with equal forces.

During operation of the transmission, such precess movement causes pivoting of the trunnions 18, 20 as the rollers 14 and 16 climb to different circles of engagement with the toric discs 12. However, as the trunnions 18, 20 are pivoted, they return to their normal neutral axial position as the new transmission ratio set by the control lever 24 is being reached.

The arrangement according to the invention provides for a simple mechanism which insures equal distribution of ratio adjusting precess forces to the traction roller pivotal support trunnions of an infinitely variable traction roller transmission with hydraulics. Such a transmission is particularly suitable for simple power transmission applications where variable speed transmissions are desirable such as mopeds, garden tractors, power take-offs, automobile accessory drives, etc.

I claim:

1. An infinitely variable traction roller transmission comprising: coaxial input and output shafts; toric traction discs mounted opposite each other, one on each of said shafts; two motion transmitting traction rollers arranged between, and in firm engagement with, said toric discs for the transmission of motion therebetween; a pivotal support trunnion for each of said traction rollers each rotatably supporting one of the rollers and being supported pivotally about an axis which extends normal to a plane including the axis of said input and output shafts; and a trunnion operating lever arrangement adapted to apply axial precess motion to said trunnions, said lever arrangement including two arms of equal length, one being pivotally connected to one and the other to the other trunnion and both being linked to each other at a central pivot axis and a control lever linked to said arms at locations having equal distances from said central pivot axis and being itself pivotally supported at the center between its points of linkage to said arms.

2. A traction roller transmission according to claim 1, wherein a ring structure is rotatably supported on the end of each trunnion and said arms are linked to said ring structures.

3. A traction roller transmission according to claim 2, wherein arms are arranged at opposite sides of said ring structures and linked thereto along axes extending through the axis of said trunnions.

4. A traction roller transmission according to claim 3, wherein said arms at opposite sides of said ring members are joined by studs disposed at equal distances from their central linkage axis and said control lever has slots receiving said studs for operating said arms.

5. A traction roller transmission according to claim 2, 3 or 4, wherein said ring structures include roller screw structures so as to provide a predetermined control lever position for each trunnion pivot position when the traction rollers are non-precessing.

* * * * *